Dec. 2, 1969   E. R. WILLAMAN   3,481,574
MOUNTING BAR FOR REARVIEW MIRRORS
Filed Dec. 15, 1967

INVENTOR.
ERNEST R. WILLAMAN
BY
*Peter L. Klempay*
AGENT

United States Patent Office 3,481,574
Patented Dec. 2, 1969

---

3,481,574
MOUNTING BAR FOR REARVIEW MIRRORS
Ernest R. Willaman, 2620 Briar St.,
Warren, Ohio 44484
Filed Dec. 15, 1967, Ser. No. 690,908
Int. Cl. A47g 1/24
U.S. Cl. 248—480                           1 Claim

ABSTRACT OF THE DISCLOSURE

A detachable mounting arrangement for a pair of mirrors for use on a motor vehicle towing a boat or trailer, to provide rearward vision for the driver of the vehicle. The mirrors are mounted on opposite ends of a bar which extends horizontally across the hood of the car and which is provided with clamping means to secure the bar to the edges of the hood. The bar may be moved forwardly and rearwardly along the hood and the mirrors may be adjusted as to their angle in relation to the bar thus allowing the mirrors to be adjusted to the optimum position.

---

When a passenger car is used to tow a trailer or boat, the mirrors normally provided on the vehicles do not provide a clear view of the road behind the vehicle as they are obstructed by the trailer. Thus it is desirable and, in some localities required, that additional rearview mirrors be provided which provide clear vision along both sides of and behind the trailer. While such mirrors may be permanently mounted on the vehicle, it is often desirable that the mirrors be removable, especially when the vehicle is freqeuntly used without the trailer.

Presently employed auxiliary rearview mirrors are mounted either on the front fenders adjacent the wheel cut-outs or on the front doors of the vehicle. Mirrors mounted in the former location partially obstruct the driver's vision of the roadway and, as they are located a substantial distance forward of the driver, provide only a small image. Mirrors mounted in the latter location are inconvenient as they require the driver to turn his head sideways to see the rear of the vehicle thus momentarily removing his eyes from the oncoming road and traffic. Some door mounted mirrors are also objectionable as they prevent the windows from being closed tightly, allowing drafts in the vehicle. Both types of mirrors are subject to vibrations which may obscure the image as the mirrors are held in position by springs. The mirrors now in use must be realigned every time they are installed and it is not possible to move either type of mirror forward or backward so as to position the mirrors in the most desirable location.

It is the primary object of my invention to provide an improved mounting arrangement for auxiliary rearview mirrors for use on vehicles towing boats or trailers which may be easily and securely fastened to the vehicle and readily adjusted to provide optimum vision along the sides of and behind the trailer. It is a further object of the invention to provide such a mounting arrangement which is not subject to image obscuring vibrations. It is also an object of my invention to provide a mirror mounting which may be removed from and reinstalled on a vehicle without disturbing the correct alignment of the mirrors. Another object of the invention is the provision of a mirror mounting arrangement which enables the mirrors to be positioned so that they may be used with a minimum of eye movement and interruption of forward vision.

The above and other objects and advantages of the invention will become apparent upon consideration of the following specification and the accompanying drawing wherein there is shown a preferred embodiment of my invention.

Figure 1:
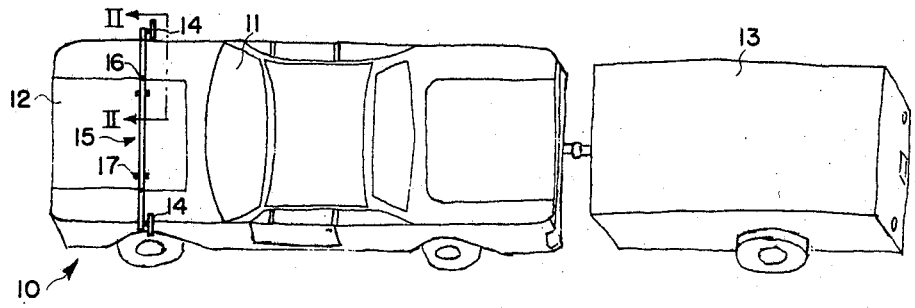
FIGURE 1 is a pictorial view of a vehicle equipped with the mirror mounting of my invention.
Figure 2:
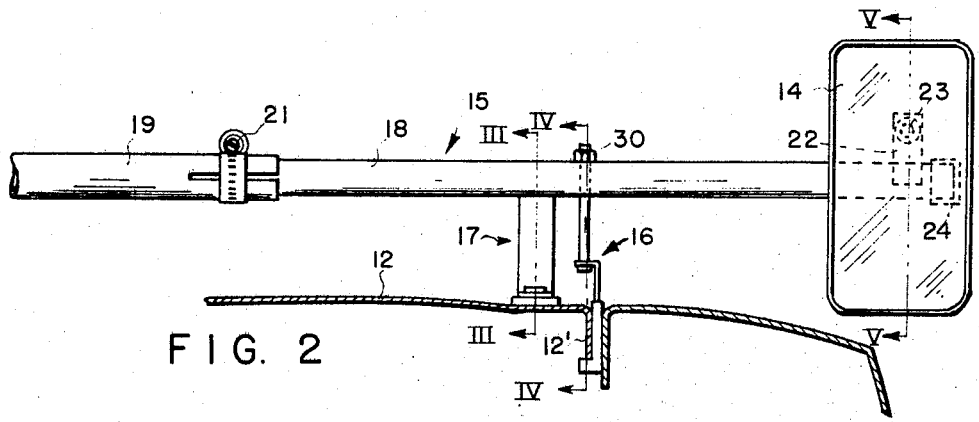
FIGURE 2 is a transverse sectional view taken along the line II—II of FIGURE 1.
Figure 3:
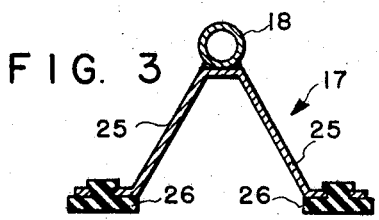
FIGURE 3 is a sectional view taken along the line III—III of FIGURE 2.
Figure 4:
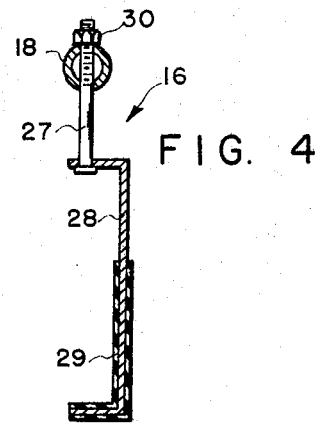
FIGURE 4 is a sectional view taken along the line IV—IV of FIGURE 2 with a portion of the clamp rotated 90° for clarity.
Figure 5:
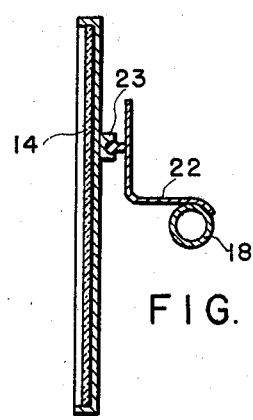
FIGURE 5 is a sectional view taken along the line V—V of FIGURE 2.

Referring first to FIGURE 1, reference numeral 10 designates an automobile having a windshield 11 and a hood 12 and towing a trailer 13. A pair of mirrors 14 mounted on opposite ends of a bar or tube 15 are positioned forwardly of the windshield 11. The bar 15 is clamped to the side edges of the hood 12 by clamps 16 and pads 17. The bar 15 may be moved longitudinally along the hood and the mirrors 14 are pivotally connected to the ends of the bar thus permitting the mirrors to be adjusted to the optimum position giving the clearest vision towards the rear of the vehicle and trailer. As the mirrors are mounted only slightly above the plane of the hood they do not obscure the driver's forward vision and as they are adjustable both in distance from the windshield and in their angle of tilt, they may be readily adjusted to the optimum position.

As will be seen in FIGURES 2-5, the bar or tube 15 may be comprised of three lengths of tubing 18, 19, and 20, tubes 18 and 20 being telescopically received in tube 19 and the assembly being firmly secured by clamps 21. This arrangement permits the bar or tube to be adjusted to varying widths and also permits the assembly to be stored and shipped in a relatively compact area. Closely adjacent the outer ends of the tubes 18 and 20 are provided brackets 22 to which the mirrors 14 are secured by a ball and socket connection 23. The outer extremities of the tubes 18 and 20 may be closed by rubber or plastic caps 24, if desired. The pads or supporting brackets 17 are positioned on the tubes 18 anad 20 a short distance towards the center line of the hood from its edge. These brackets consist of two legs 25 having rubber grommets or pads 26 at their lower ends and welded at their upper ends to the tubes 18, 20. The clamps 16 are positioned on the tubes 18, 20 immediately above the edges of the hood. These clamps consist of a threaded stud 27 which extends downwardly through the tube 18 and which is provided at its lower end with a C-shaped member 28 which has a rubber or other protective coating 29. The upper end of the stud 27 projecting above the bar 18 is provided with a shake-proof or lock nut 30. The bar 15 with the mirrors 14 is secured to the vehicle by engaging the lower ends of the clamps 28 on the downwardly projecting lip 12' of the hood 12 and subsequently tightening the nuts 30 so as to securely clamp the bar 15 by means of the clamps 16 and pads 17 to the hood 12 of the vehicle. It will be understood that the C-shaped member 28 is thin enough to fit between the small gap between the hood and the fender of the vehicle. As the bar 15 and mirrors 14 are tightly clamped to the vehicle without the use of springs, the mirrors 14 are not subject to excessive vibrations but rather are as steady as permanently attached mirrors.

Once the assembly has been positioned in the optimum position, marks may be made on the interior of the hood at the points where the C-shaped members 28 are positioned and when the unit is removed and subsequently reinstalled the C-shaped members 28 may be aligned with these marks thus assuring that the mirrors are correctly positioned and eliminating the necessity of adjusting the mirrors every time the unit is reinstalled on the vehicle.

The angle of the mirrors 14 with respect to the bar 15 is not disturbed when the mirrors are removed or mounted on the vehicle and as the bar 15 may be positioned in the same location each time it is reinstalled it is only necessary to position the bar and not necessary to adjust the mirrors.

It will now be apparent that I have invented an improved mirror mounting assembly which is of simple construction and which holds the mirrors firmly to the vehicle eliminating undesirable vibrations. It will also be apparent that the assembly of my invention permits the mirrors to be rapidly reinstalled on the vehicle without the necessity of realigning the mirrors so as to provide the clearest vision of the rear of the vehicle and trailer or boat.

I claim:

1. A removable rearview mirror mounting assembly for use on a motor vehicle having a hood, comprising: a tubular member; an elongated bar telescopically received in each end of said tubular member and adjustably clamped thereto; clamping means secured to each of said elongated bars and adapted to engage the side flange portion of said hood; support members secured to each of said bars closely adjacent said clamping means and adapted to contact the upper surface of said hood closely adjacent the edge thereof; a mirror assembly adjustably secured to the free end of each of said elongated bars; said clamping means comprise a C-shaped member the side portion of which extends between the vehicle hood and fender, the lower leg of which projects inwardly along said side flange portion of said hood, and the upper leg of which extends inwardly from the edge of said hood; and an upwardly extending bolt which is attached to said upper leg and passes through said elongated bar and is adjustably secured thereto by a nut.

References Cited

UNITED STATES PATENTS

| 3,259,349 | 7/1966 | Lee | 248—226 |
| 3,305,202 | 2/1967 | Christenson | 248—201 |

ROY D. FRAZIER, Primary Examiner

F. DOMOTOR, Assistant Examiner